United States Patent [19]

Hung

[11] Patent Number: 5,668,612

[45] Date of Patent: Sep. 16, 1997

[54] PIVOTABLE PROTECTIVE SCREEN STRUCTURE WHICH IS HEIGHT-ADJUSTABLE AND FORWARD/BACKWARD SHIFTABLE

[76] Inventor: Wang-Ho Hung, No.181, Sec.5, Chang-Mei Rd., Ho-Mei Chen, Changhua Hsien, Taiwan

[21] Appl. No.: 466,967

[22] Filed: Jun. 6, 1995

[51] Int. Cl.[6] .................................................... H04N 5/65
[52] U.S. Cl. .................. 348/818; 348/819; 348/820; 348/842; 359/601; 359/609; 248/918; 361/220; 361/681
[58] Field of Search .................. 348/818, 823, 348/834, 840, 842, 819, 820, 786; 359/601, 604, 609; 248/918, 297.31; 361/220, 681; H04N 5/65

[56] References Cited

U.S. PATENT DOCUMENTS

| | | | |
|---|---|---|---|
| 5,227,916 | 7/1993 | Theirl et al. | 359/609 |
| 5,404,181 | 4/1995 | Hung | 359/601 |
| 5,448,405 | 9/1995 | Clausen et al. | 359/601 |
| 5,526,180 | 6/1996 | Raushitz | 359/601 |

*Primary Examiner*—Thomas L. Stoll
*Attorney, Agent, or Firm*—Browdy and Neimark

[57] ABSTRACT

A pivotable protective screen structure which is height-adjustable and forward/backward shiftable. The protective screen structure includes a base body, a protective screen body and two support racks. The base body is formed with a slot passing through the entire base body and two pairs of slide channels disposed on two sides of the slot. In each pair of the slide channels are disposed opposite engaging teeth. The protective screen body includes a protective screen and a frame body framing the protective screen. Two shaft rods are disposed on two sides of the frame body. The support rack has two horizontal support levers defining a clearance therebetween and formed with upper and lower engaging teeth for engaging with the engaging teeth of the slide channels of the base body. The support rack further has a vertical rectangular hanging frame connected to front ends of the support levers and communicated with the clearance thereof. A vertical row of hanging hooks are disposed in the hanging frame for the shaft rods of the protective screen body to pivotably hang thereon, whereby the support levers of the support rack are slidably inserted into and located in the slide channels of the base body to adjust a distance between the protective screen body and a television. The shaft rods of the protective screen body can be selectively hung on the hanging hooks of the support racks to adjust the height of the protective screen body.

3 Claims, 12 Drawing Sheets

PIVOTABLE PROTECTIVE SCREEN STRUCTURE WHICH IS HEIGHT-ADJUSTABLE AND FORWARD/BACKWARD SHIFTABLE

BACKGROUND OF THE INVENTION

The present invention relates to a pivotable protective screen structure which is height-adjustable and forward/backward shiftable.

Figure 1:
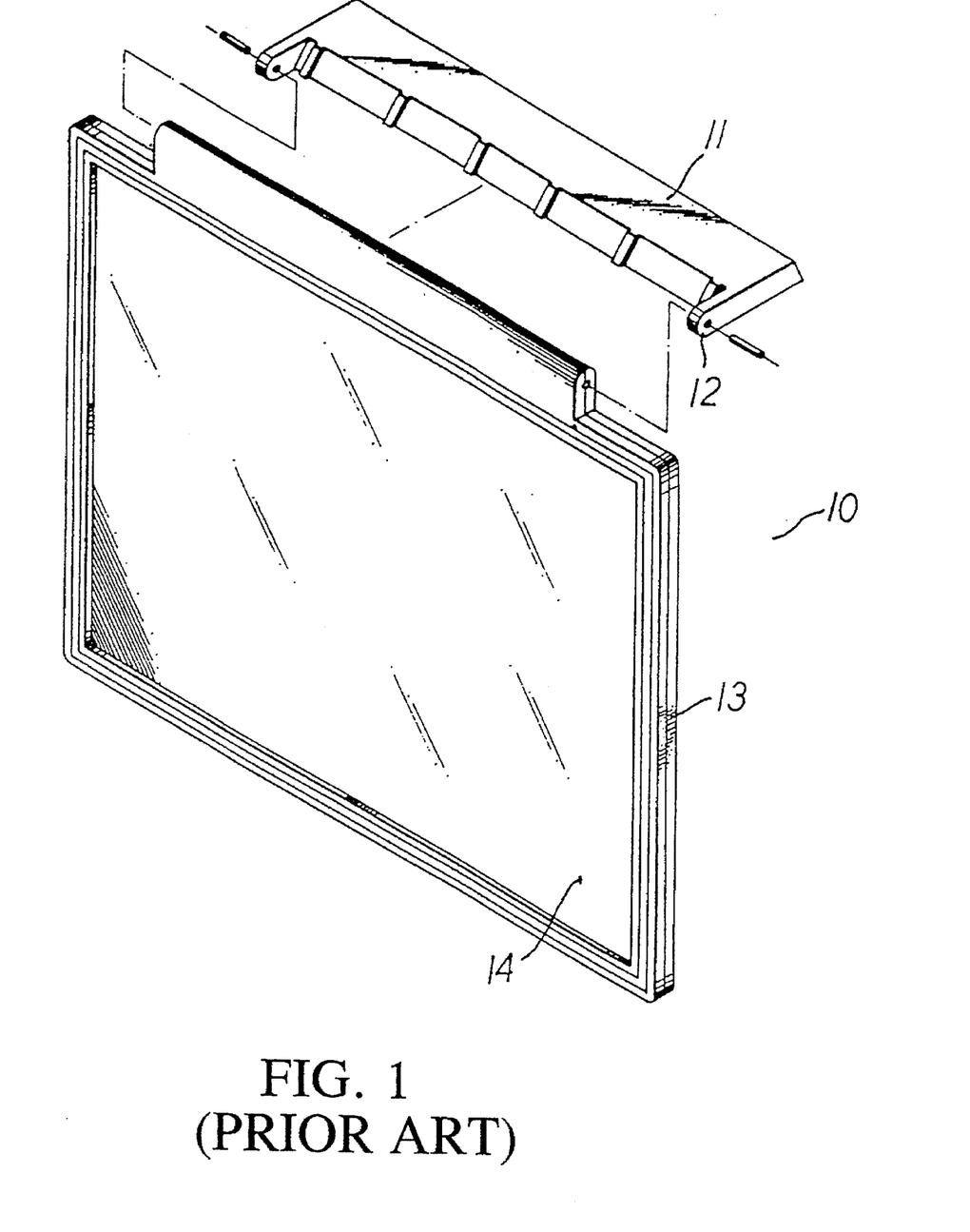
FIG. 1 is a perspective exploded view of a conventional protective screen structure.
Figure 2:
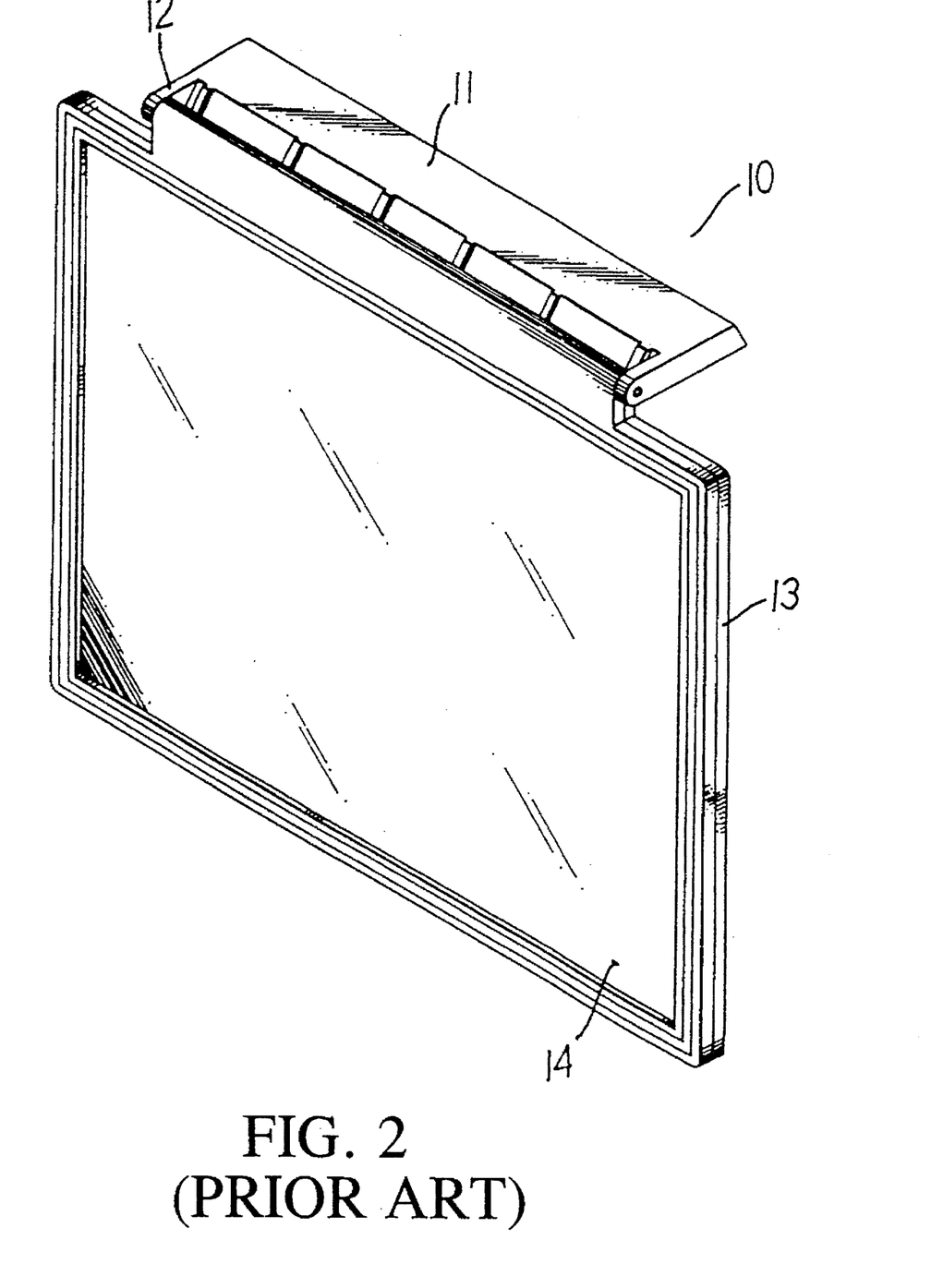
FIG. 2 is a perspective assembled according to FIG. 1.

FIGS. 1 and 2 show a conventional protective screen structure 10 which includes a base body 11 having two lateral lugs 12 for pivotally connecting with a frame body 13 framing a protective screen 14.

Figure 3:
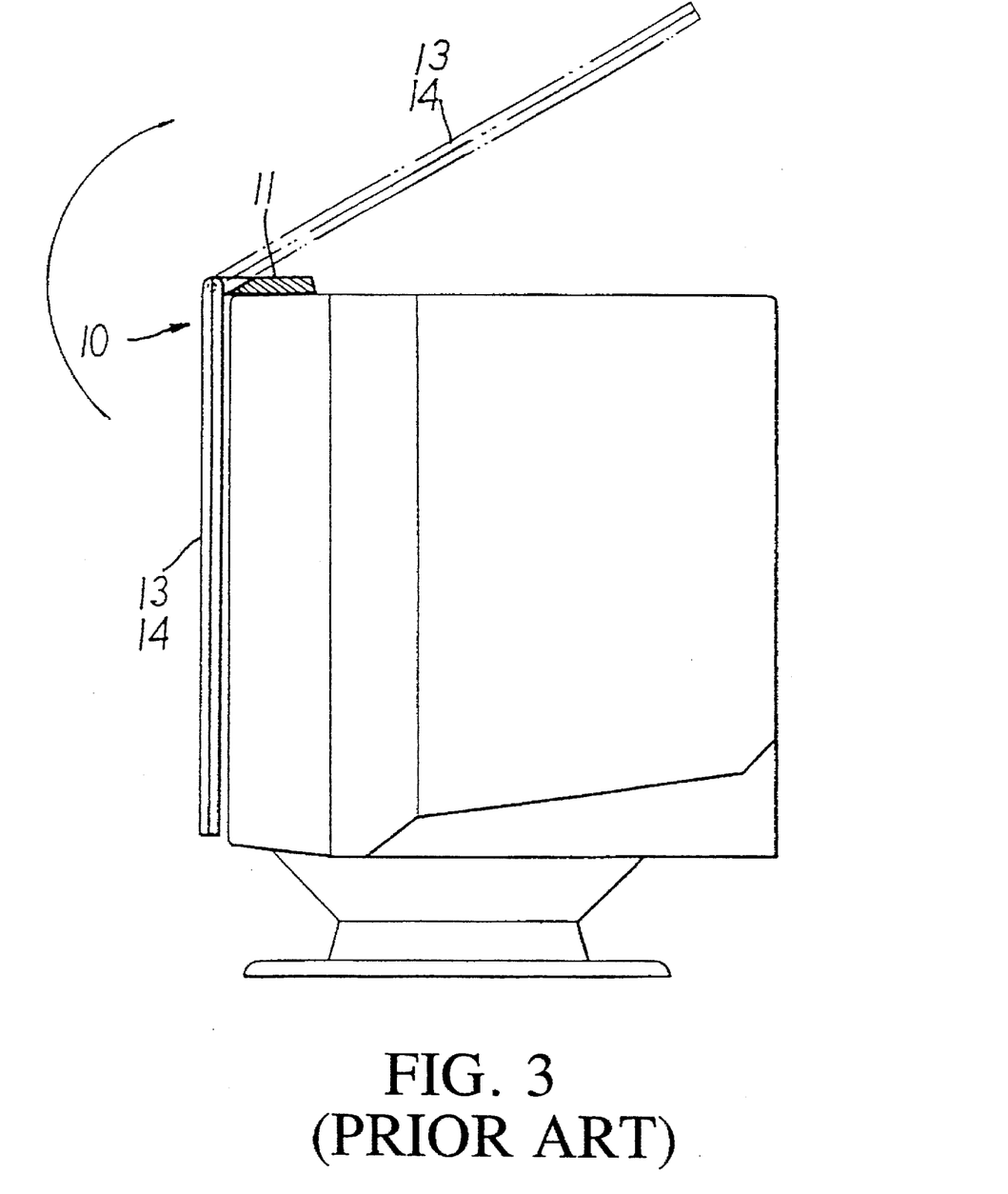
FIG. 3 is a side view showing the pivoting movement of the conventional protective screen structure.

The base body 11 is fixed on a television or a monitor so that the frame body 13 with the protective screen 14 can be pivoted about the lugs 12. Accordingly, when the screen of the television or the monitor is contaminated by dust or the dust is adhered to the inner or outer surfaces of the protective screen 14 itself, the frame body 13 can be pivoted upward and located in an inclined position above the screen of the television so as to clean up the screen of the television or the protective screen 14. FIG. 3 illustrates how this protective screen rotates on its support.

According to the above arrangements of the conventional protective screen structure 10, several shortcomings exist as follows:

1. The frame body 13 with the protective screen 14 can only rotate about the lugs 12 of the base body 11 and cannot be adjusted in height so that the conventional protective screen structure is not applicable to otherwise dimensioned television or monitor.

2. The frame body 13 can only be pivoted about the lugs 12 of the base body 11 so that after the base body 11 is fixed, the frame body 13 cannot be shifted forward or backward, that is, the distance between the protective screen and the screen of the television or monitor cannot be adjusted.

3. When it is necessary to clean the screen of the television or monitor or the back surface of the protective screen, the frame body 13 must be pivoted upward to the inclined position above the television as shown in FIG. 3. Under such circumstance, the frame body 13 is apt to swing downward to cause damage of the television or the protective screen. In addition, the frame body 13 is apt to depart from the base body 11 and drop down.

Therefore, it is necessary to provide an improved protective screen which can be adjusted in height. Moreover, the distance between the protective screen and the screen of the television can be adjusted. Also, the protective screen can be securely located on the television to ensure the safety in cleaning the screen of the television or the protective screen.

SUMMARY OF THE INVENTION

It is a primary object of the present invention to provide a pivotable protective screen structure which is height-adjustable and forward/backward shiftable, in which the protective screen body can be selectively located on a suitable level to adjust the height of the protective screen body so as to suit different dimensions of televisions. The protective screen structure can be slided forward or rearward along to adjust the distance between the protective screen structure and the television.

It is a further object of the present invention to provide the above protective screen structure which can be pivoted upward into a horizontal position above the television and stably located thereon for ensuring the safety in cleaning the screen of the television or the protective screen structure.

It is still a further object of the present invention to provide the above protective screen structure in which a U-shaped insertion socket is disposed on outer side of a hanging frame of a support rack of the protective screen structure for connecting with a supporting plate. The supporting plate has an insertion shaft at one end for inserting into the U-shaped insertion socket, whereby the supporting plate can be swung about the insertion socket. A clip member is disposed on the supporting plate for clamping a document to be read.

According to the above objects, the present invention includes a base body, a protective screen body and two support racks. The base body is formed with a slot passing through the entire base body and two pairs of slide channels disposed on two sides of the slot. In each pair of the slide channels are disposed opposite engaging teeth. The protective screen body includes a protective screen and a frame body framing the protective screen. Two shaft rods are disposed on two sides of the frame body. The support rack has two horizontal support levers defining a clearance therebetween and formed with upper and lower engaging teeth for engaging with the engaging teeth of the the slide channels of the base body. The support rack further has a vertical rectangular hanging frame connected to front ends of the support levers and communicated with the clearance thereof. A vertical row of hanging hooks are disposed in the hanging frame for the shaft rods of the protective screen body to pivotably hang thereon, whereby the support levers of the support rack are slidably inserted into and located in the slide channels of the base body to adjust a distance between the protective screen body and a television. The shaft rods of the protective screen body can be selectively hung on the hanging hooks of the support racks to adjust the height of the protective screen body.

The present invention can be best understood through the following description and accompanying drawings, wherein:

DETAILED DESCRIPTION OF THE PREFERRED EMBODIMENTS

Figure 4:
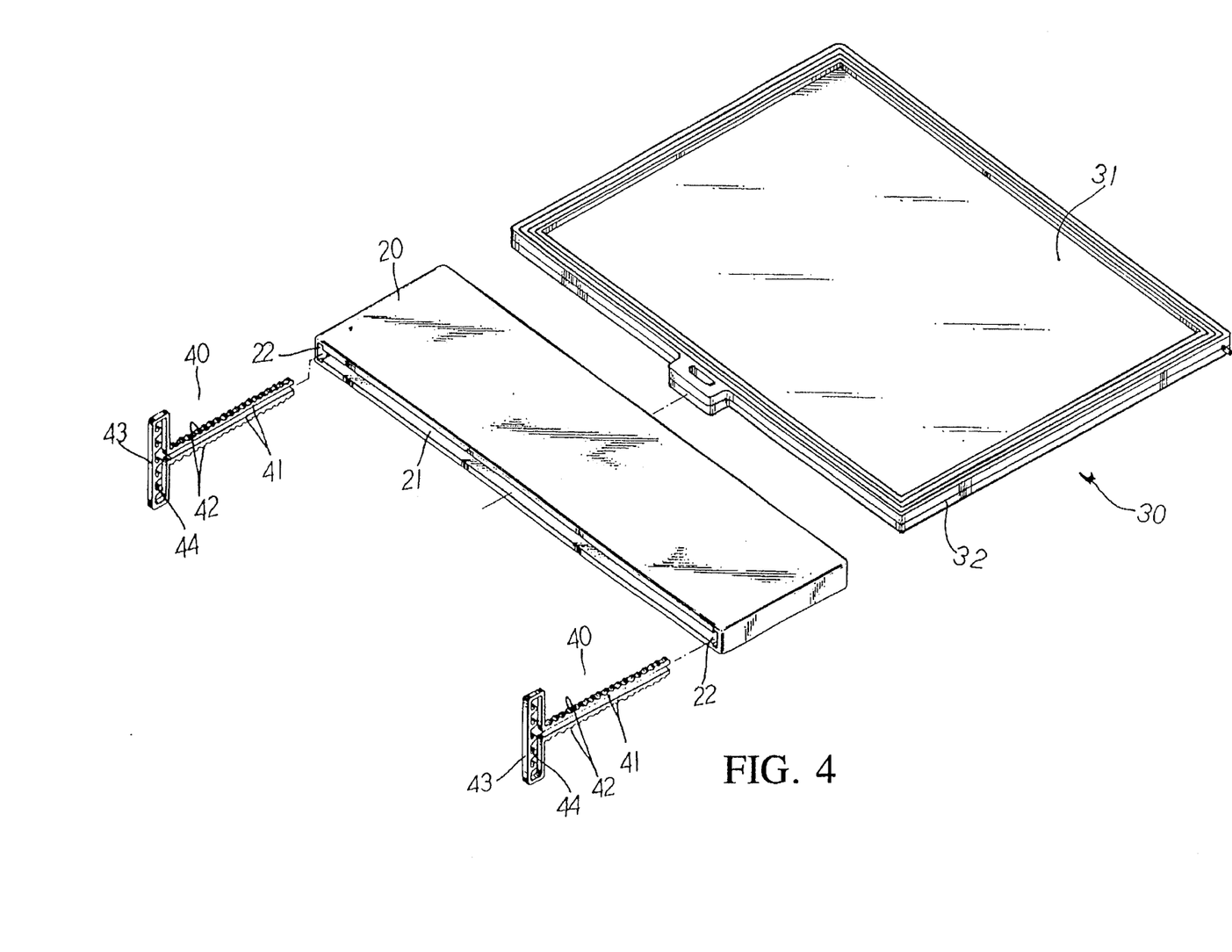
FIG. 4 is a perspective exploded view of the present invention.
Figure 5:
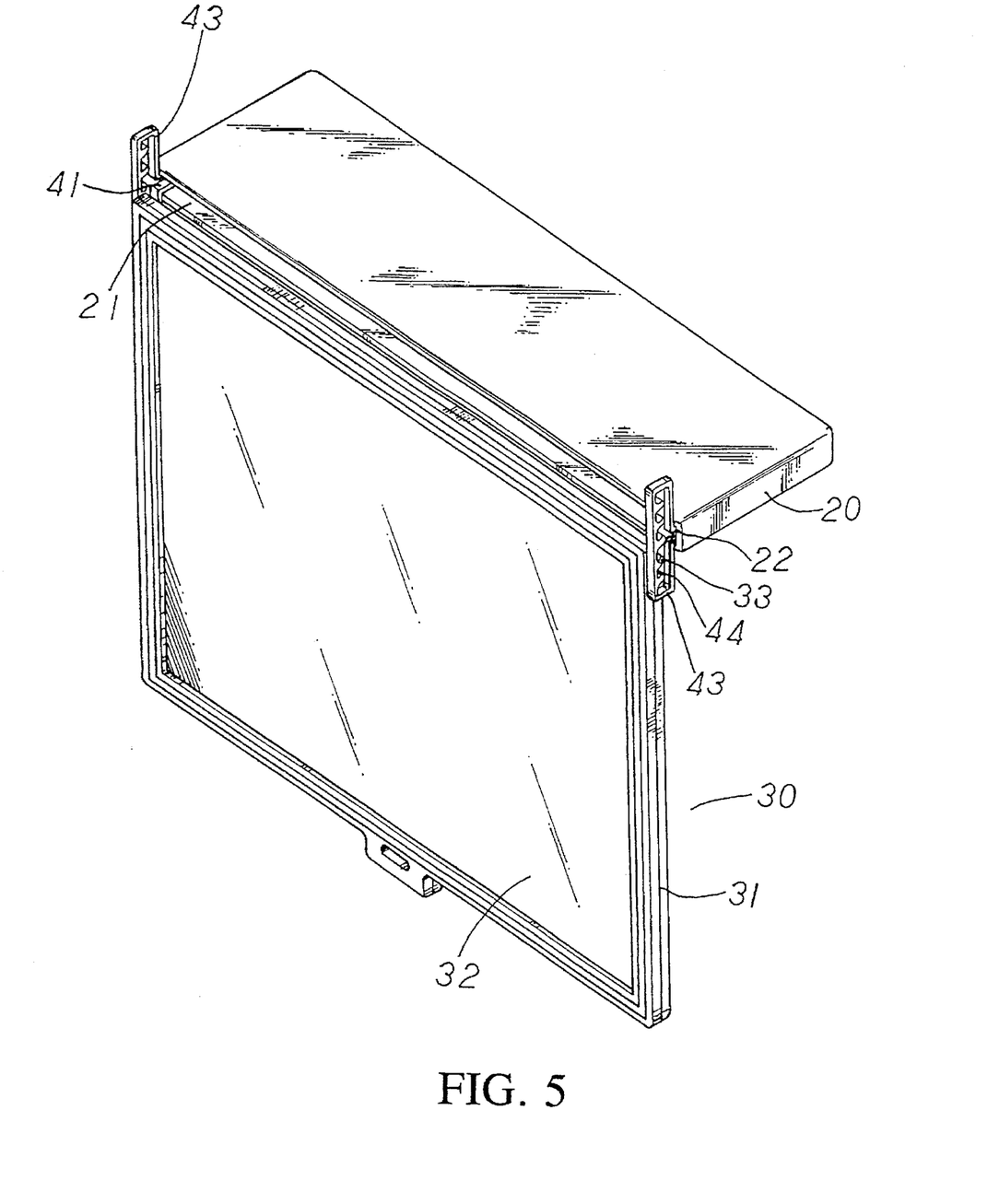
FIG. 5 is a perspective assembled view according to FIG. 4.

Please refer to FIGS. 4 and 5. The protective screen structure of the present invention includes a base body 20, a protective screen body 30 and two support racks 40.

The base body 20 is a rectangular flat body formed with a slot 21 passing through the entire base body 20 and two pairs of slide channels 22 disposed on two sides of the slot 21. In each pair of the slide channels 22 are disposed opposite engaging teeth 23.

The protective screen body 30 includes a protective screen 31 and a frame body 32 framing the protective screen 31. Two shaft rods 33 are disposed on two sides of the frame body 32. The total width of the frame body 32 and the two shaft rods 33 is slightly less than that of the slot 21 of the base body 20.

The support rack 40 is integrally formed and T-shaped, having two horizontal support levers 41 defining a clearance therebetween and formed with upper and lower engaging teeth 42 and adapted to be slidably inserted in the slide channels 22 Of the base body 20, whereby the engaging teeth 42 can engage with the engaging teeth 23 of the slide channels 22. In addition, the support rack 40 has a vertical rectangular hanging frame 43 connected to front ends of the support levers 41 and communicated with the clearance thereof. A vertical row of hanging hooks 44 are disposed in the hanging frame 43 for the shaft rods 33 of the protective screen body 30 to pivotably hang thereon.

The support levers 41 of the support rack 40 are rearward inserted into and located in the slide channels 22 of the base body 20, while the protective screen body 30 is passed forward through the slot 21 of the base body 20 to protrude outside the base body 20 with the shaft rods 23 passing through the clearance between the support levers 41 and entering the hanging frame 43 and pivotably hung on the hanging hooks 44 thereof.

Figure 6:
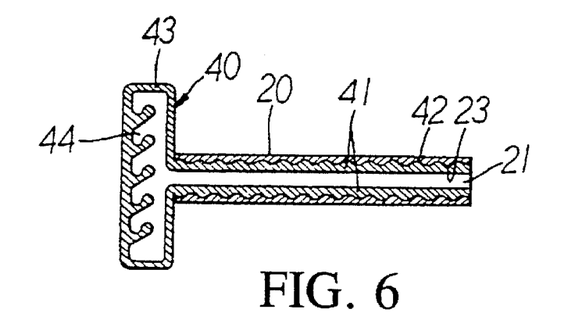
FIG. 6 is a sectional view showing the connection of the base body and the support rack of the present invention.
Figure 7:
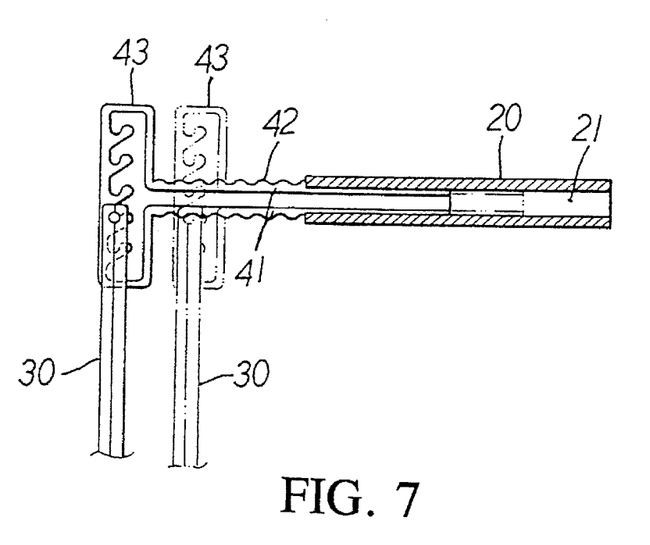
FIG. 7 is a side view showing the forward/backward sliding movement of the support rack along the slide channel of the base body.

Please refer to FIG. 6. The engaging teeth 23 of the slide channels 22 can be snugly engaged with the engaging teeth 42 of the support levers 41 so as to slidably locate the same in the slide channels 22. The support levers. 41 are spaced by the clearance therebetween so that when sliding along the slide channels 22, the support levers 41 can be resiliently compressed until the engaging teeth 23, 42 are engaged with each other to locate the support racks 40 in a suitable position. Therefore, the position of the support racks 40 is adjustable along the slide channels 22 as shown in FIG. 7.

Figure 8:
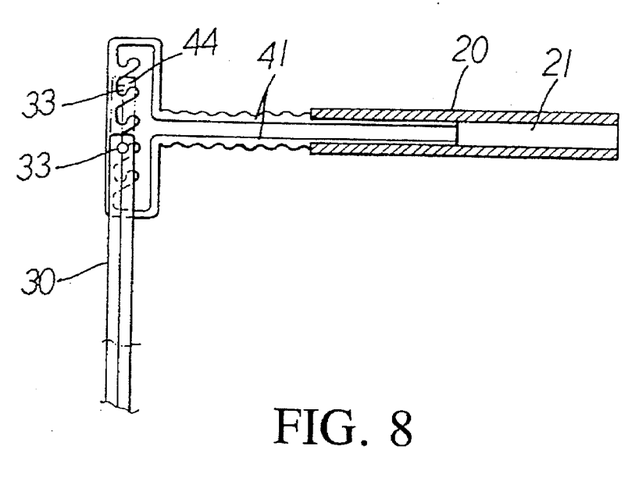
FIG. 8 is a side view showing that the protective screen body is selectively height-adjustably hung on the hanging hooks of the support rack.

Referring to FIG. 8, the shaft rods 33 of the frame body 31 can be pivotably selectively hung on the hanging hooks 44 of the hanging frame 43, whereby by means of hanging the shaft rods 33 of the frame body 31 on different hanging hooks 44, the height of the protective screen body 30 can be adjusted.

Figure 9:
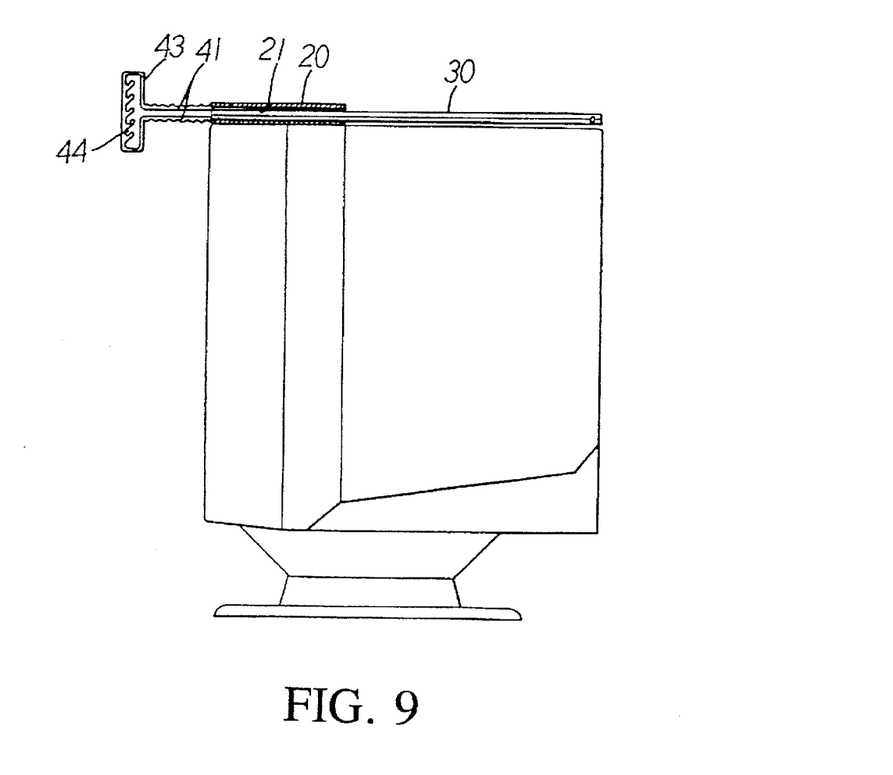
FIGS. 9 and 9A show that the protective screen body is pivoted upward and pushed into the base body.
Figure 9A:
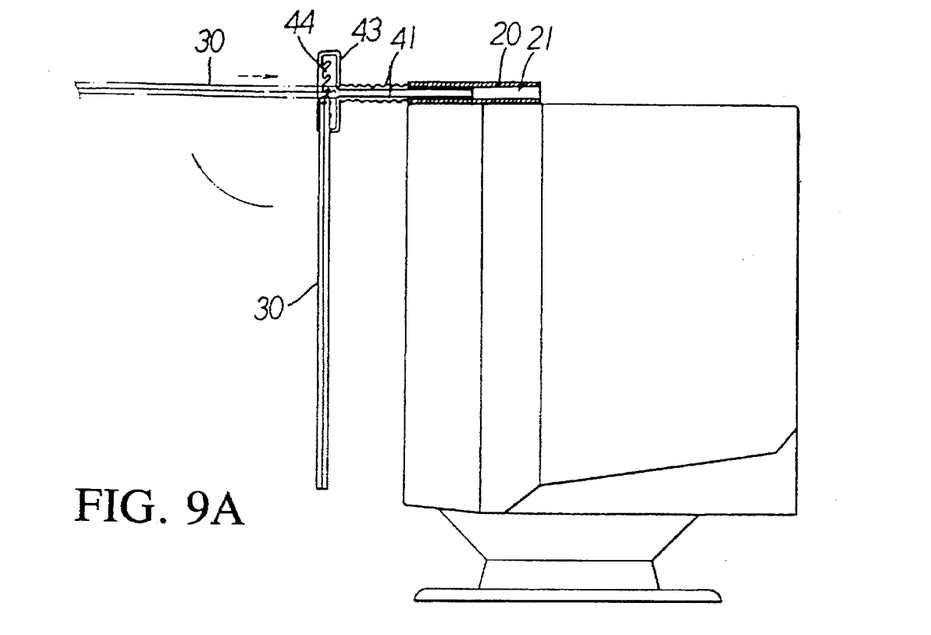

According to the above arrangements, when applied to a television or a monitor of a computer, the base body 20 can be fixed thereon by an adhesive tape or a fastener as shown in FIG. 9 with the shaft rods 33 of the protective screen body 30 selectively hung on the hanging hooks 44 of the support racks 40 to adjust the height of the protective screen body 30. In addition, the support racks 40 can be slided forward or rearward along the slide channels 22 to adjust the distance between the protective screen body 30 and the television.

Moreover, when the screen of the television or the inner surface of the protective screen body 30 is contaminated and needs to be cleaned, the protective screen body 30 can be pivoted upward into a horizontal state in alignment with the slot 21 of the base body 20. At this time, the protective screen body 30 can be pushed into the slot 21 of the base body 20 and firmly located therein as shown in FIG. 9. Therefore, when cleaning the screen of the television, the protective screen body 30 will not swing downward. After the cleaning is completed, the protective screen body 30 is reversely drawn forward and hung on the hanging hooks 40 of the support racks 40.

Figure 10:
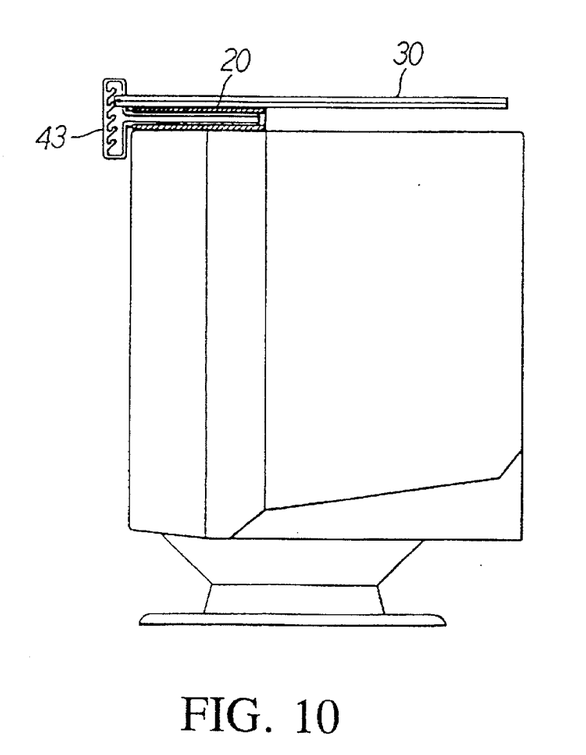
FIGS. 10 and 10A show that the protective screen body is completely pivoted upward and located in a horizontal position above the television.
Figure 10A:
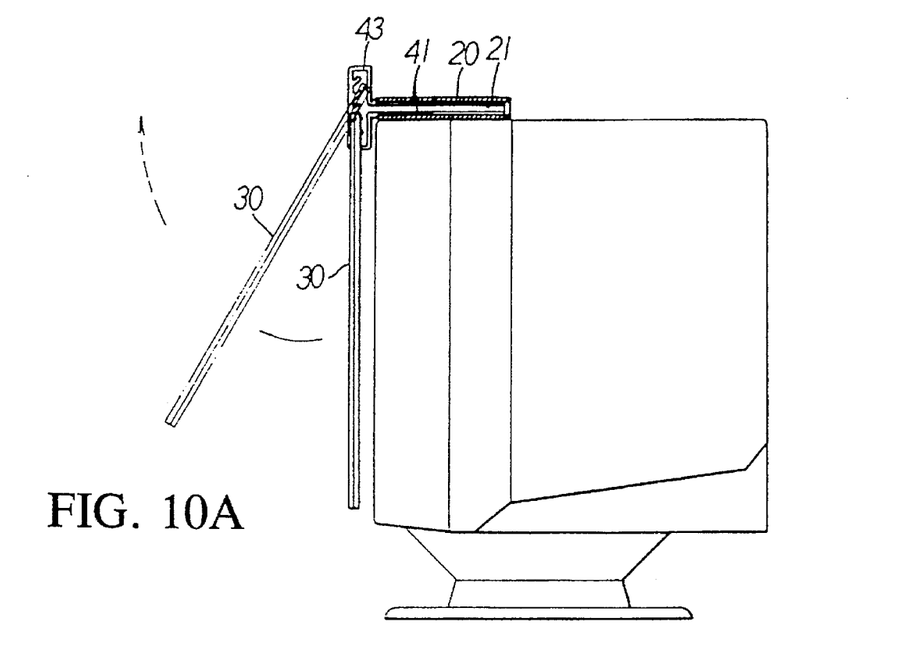

In addition to the above pushing/drawing operation, the protective screen body 30 can be pivoted upward with the shaft rods 23 separated from the hanging hooks 44 as shown in FIG. 10. At this time, the protective screen body 30 can be completely pivoted backward and positioned on the television in a horizontal state.

Figure 11:
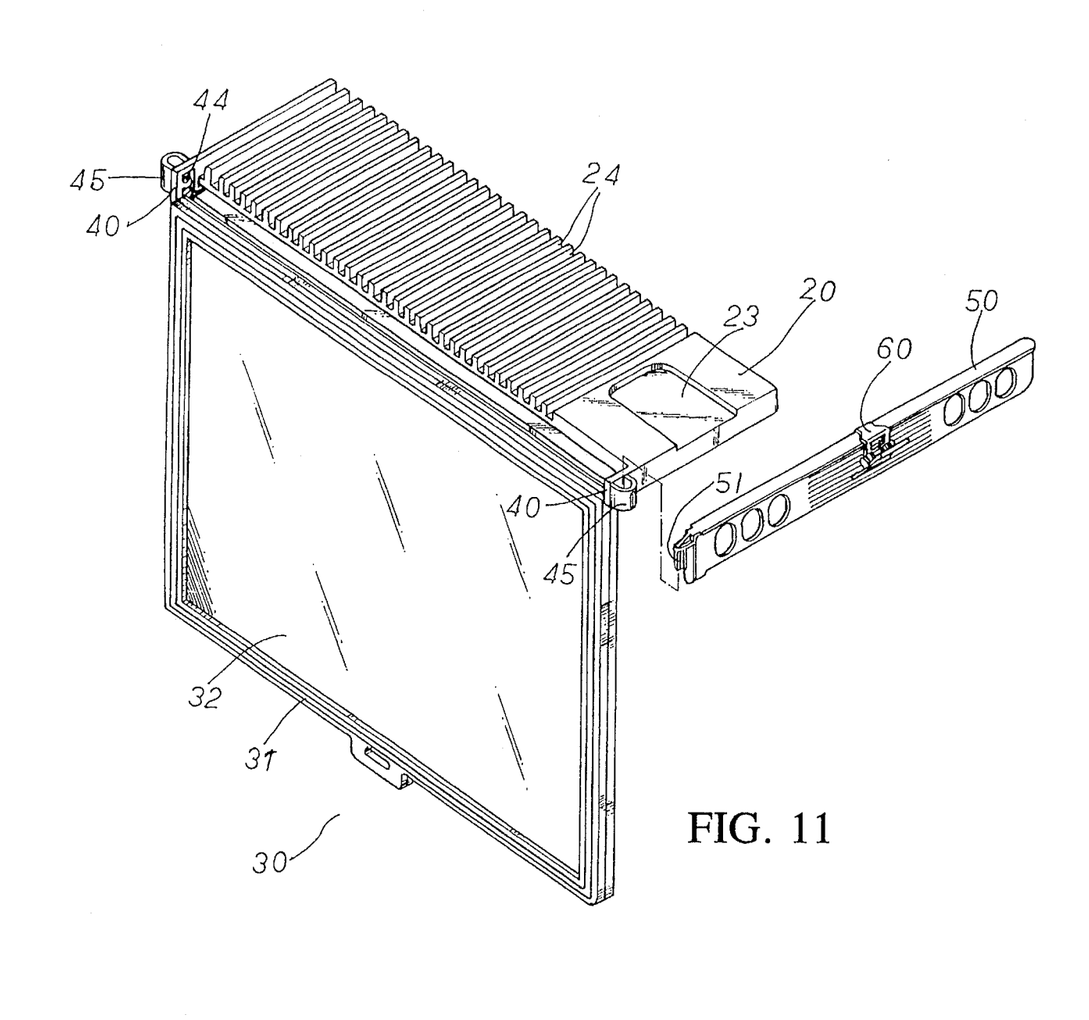
FIG. 11 is a perspective exploded view showing that a supporting plate is connected with one end of the support rack and the upper surface of the base body is formed with a mouse recess and multiple CD insertion channels.

FIG. 11 shows another embodiment of the base body 20 and the support racks 40, wherein the upper surface of the base body 20 is formed with a mouse recess 23 and multiple longitudinal CD insertion channels 24. In addition, a U-shaped insertion socket 45 is disposed on outer side of each hanging frame 43 of the support racks 40 for connecting with a supporting plate 50. The supporting plate 50 has an L-shaped insertion shaft 51 at one end. The insertion shaft 51 has an insertion portion with a cross-like cross-section.

Figure 12:
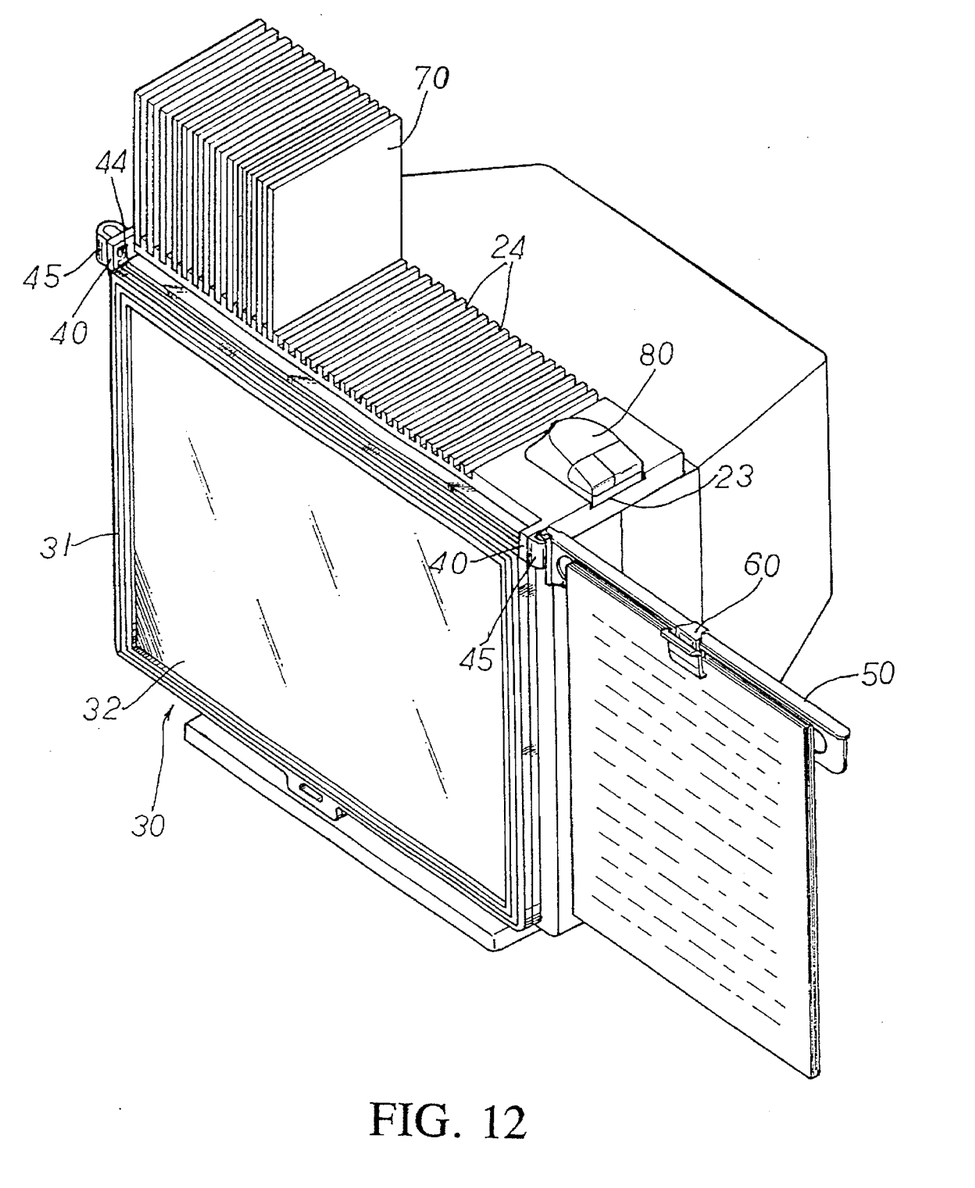
FIG. 12 is a perspective assembled view according to FIG. 11.

Referring to FIG. 12, the insertion portion of the insertion shaft 51 is inserted into the U-shaped insertion socket 45, whereby the supporting plate 50 can be swung about the insertion socket 45. A clip member 60 is disposed on the supporting plate 50 for clamping a document to be read. Multiple CDs or optic disks 70 can be inserted in the CD insertion channels 24 and a mouse can be placed in the mouse recess 23.

Figure 13:
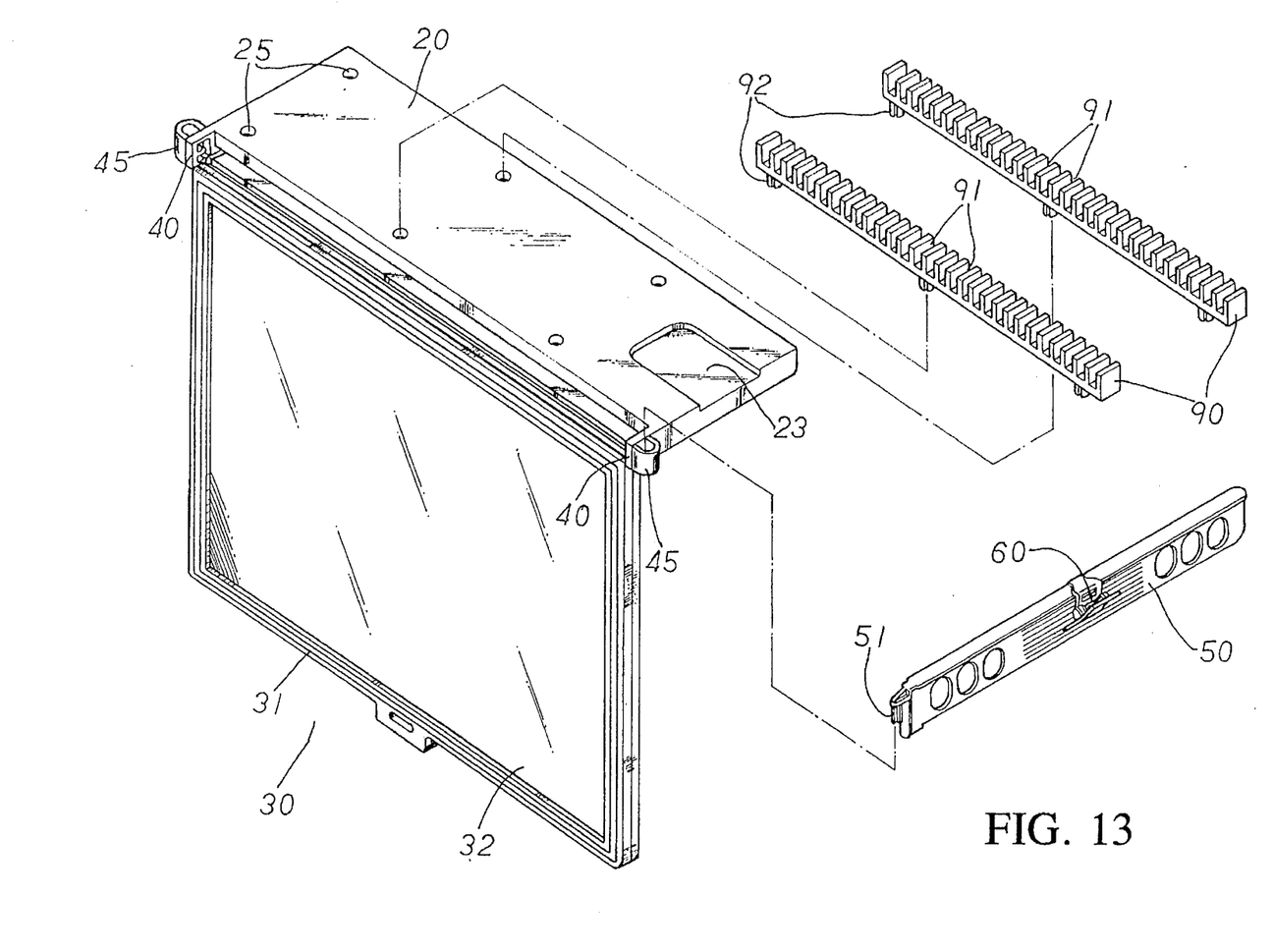
FIG. 13 is a perspective exploded view showing another embodiment of the CD insertion channels.
Figure 14:
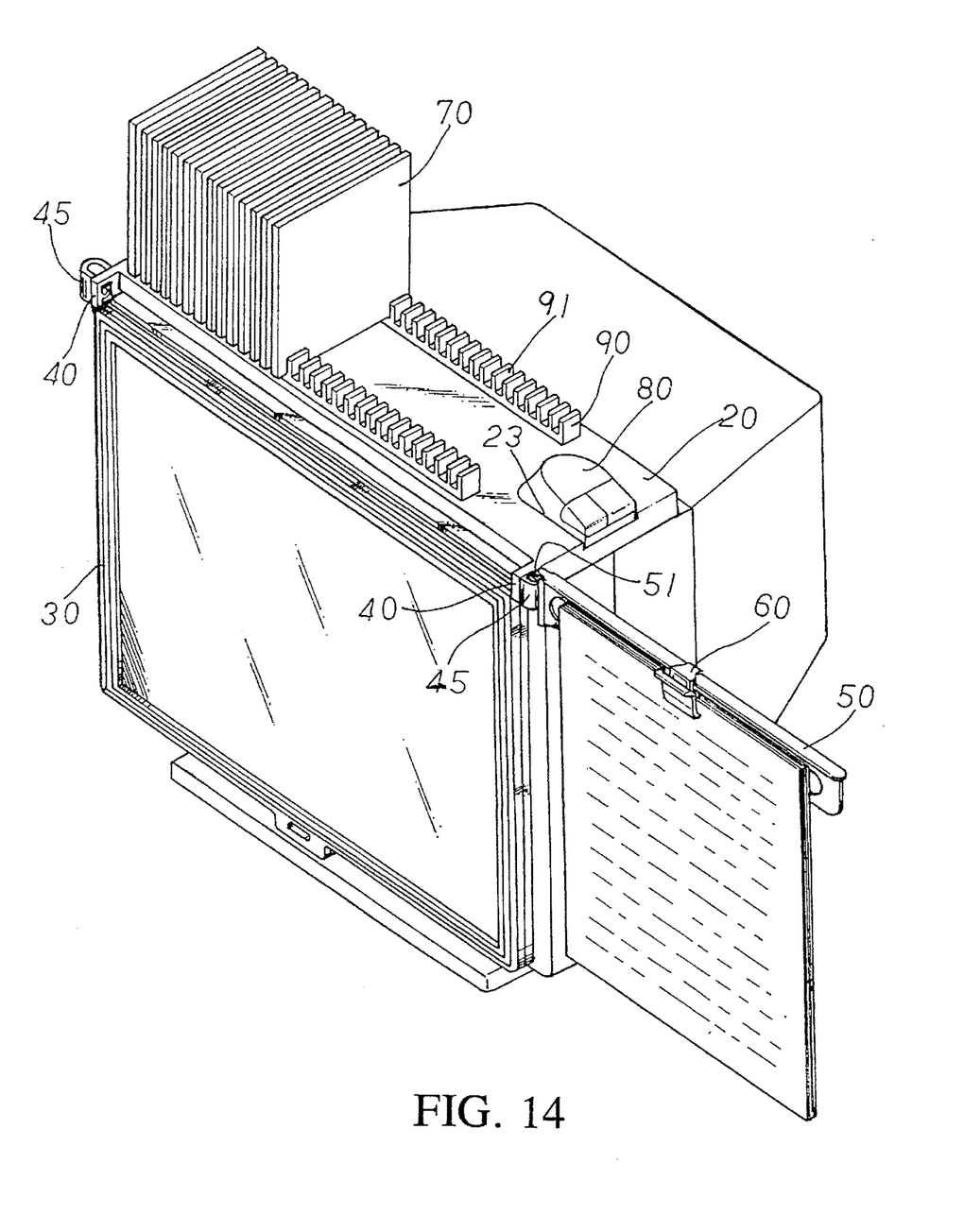
FIG. 14 is a perspective assembled view according to FIG. 13.

Referring to FIG. 13, alternatively, the surface of the base body can be formed with several insertion holes 25, whereby several insertion posts 92 of two CD rests 90 can be inserted thereinto and multiple CDs or optic disks 70 can be placed in CD channels 91 of the CD rests 90.

The above preferred embodiments are only some examples of the present invention and the scope of the present invention should not be limited to the examples. Any modification or variation derived from the examples should fall within the scope of the present invention.

What is claimed is:

1. A pivotable protective screen structure which is height-adjustable and forward/backward shiftable, comprising a base body, a protective screen body and two support racks, wherein:

the base body is a rectangular flat body formed with a slot passing through the entire base body and two pairs of slide channels disposed on two sides of the slot, in each pair of the slide channels being disposed opposite engaging teeth;

the protective screen body includes a protective screen and a frame body framing the protective screen, two shaft rods being disposed on two sides of the frame body, a total width of the frame body and the two shaft rods being slightly less than that of the slot of the base body; and each support rack is integrally formed and T-shaped, having two horizontal support levers defining a clearance therebetween and one lever is formed with upper engaging teeth and the other with lower engaging teeth and adapted to be slidably inserted in the slide channels of the base body, whereby the engaging teeth can engage with the engaging teeth of the slide channels, each support rack further having a vertical rectangular hanging frame connected to front ends of the support levers, a vertical row of hanging hooks being disposed in the hanging frame for the shaft rods of the protective screen body to pivotably hang thereon, whereby the support levers of the support rack are rearward inserted into and located in the slide channels of the base body, while the protective screen body is passed forward through the slot of the base body to protrude outside the base body with the shaft rods passing through the clearance between the support levers and entering the hanging frame and pivotably hung on the hanging hooks thereof, the shaft rods of the protective screen body being selectively hung on the hanging hooks of the support racks to adjust the height of the protective screen body, the support racks being forward or rearward slidable along the slide channels to adjust a distance between the protective screen body and a television, the protective screen body being also upward pivotable into a horizontal state in alignment with the slot of the base body and stably located on the television.

2. A protective screen structure as claimed in claim 1, wherein an upper surface of the base body is formed with a mouse recess and multiple longitudinal CD insertion channels and a U-shaped insertion socket is disposed on outer side of each hanging frame of the support racks for connecting with a supporting plate, the supporting plate having an L-shaped insertion shaft at one end, the insertion shaft having an insertion portion with a cross-like cross-section, the insertion portion of the insertion shaft being inserted into the U-shaped insertion socket, whereby the supporting plate can be swung about the insertion socket, a clip member being disposed on the supporting plate for clamping a document to be read and multiple CDs or optic disks can be inserted in the CD insertion channels and a mouse can be placed in the mouse recess.

3. A protective screen structure as claimed in claim 1, wherein the upper surface of the base body is formed with several insertion holes, whereby several insertion posts of two CD rests can be inserted thereinto and multiple CDs or optic disks can be placed in CD channels of the CD rests.

* * * * *